United States Patent [19]

Marshall et al.

[11] 4,382,220

[45] May 3, 1983

[54] RECHARGEABLE BATTERY PACK AND COMBINATION THEREOF WITH LANTERN

[75] Inventors: Francis G. Marshall, Meriden; Ralph F. Moore, Greenwich, both of Conn.

[73] Assignee: The Bridgeport Metal Goods Mfg. Co., Bridgeport, Conn.

[21] Appl. No.: 284,989

[22] Filed: Jul. 20, 1981

[51] Int. Cl.³ .............................................. H02J 7/00
[52] U.S. Cl. ........................................................ 320/2
[58] Field of Search ............................. 320/2, 3, 4, 5; 429/100

[56] References Cited

U.S. PATENT DOCUMENTS 3,013,198 12/1961 Witte et al. ............................. 320/2
3,296,514 1/1967 Pearson .................................... 320/5

Primary Examiner—William M. Shoop
Attorney, Agent, or Firm—Cifelli, Frederick & Tully

[57] ABSTRACT

A rechargeable battery pack has a rectangular case formed in two box halves secured together at a seam about the top, side and bottom panels thereof, two rechargeable batteries positioned in the case between the bottom and side panels and front and rear panels and cross-ribs extending inwardly from the interior surfaces of the front and rear panels, a transformer for charging the batteries positioned between the front and rear panels by U-shaped flanges extending inwardly from the interior surfaces thereof, two terminals extending through openings in the top of the case formed at the seam and spring biased outwardly by coil springs deployed between the top panel and the heads of the terminals, two secondary terminals mounted within the case and including flexible spring blades self-biased into contact with the feet of the terminals within the case, and wiring connecting the batteries with the secondary terminals for current draw and with the transformer for recharging including a line cord from the transformer through an opening found at the case seam to a plug. When the batteries are of the lead acid type, the flexible spring blades have a free position leaving an air gap relative to the terminal feet, thereby minimizing the possibility of shorting the batteries. The rechargeable battery pack is used in combination with a lantern which has a rib structure accommodating both a standard lantern battery and the rechargeable battery pack, which has different dimensions.

13 Claims, 7 Drawing Figures

U.S. Patent  May 3, 1983  Sheet 1 of 2  4,382,220
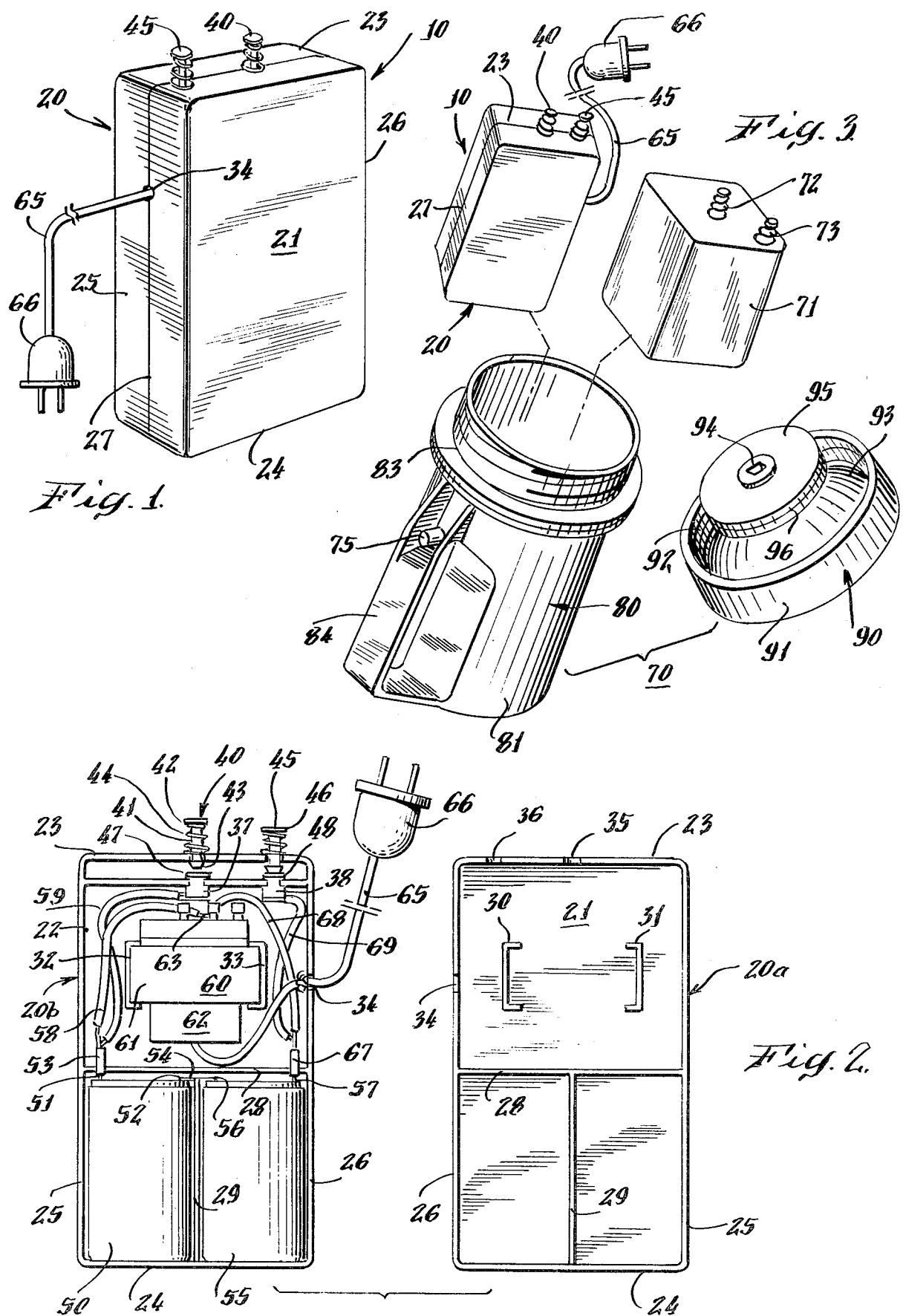

RECHARGEABLE BATTERY PACK AND COMBINATION THEREOF WITH LANTERN

BACKGROUND OF THE INVENTION

This invention relates to a rechargeable pack and to the combination of the rechargeable battery pack with a hand lantern or similar device which also uses a conventional lantern battery.

Devices such as hand lanterns have been available for a long time. Most of them have been designed to accept a zinc carbon lantern battery, which is not rechargeable. Other batteries, such as alkaline types, have come to the market, but are also not rechargeable. The usefulness and the cost of using a hand lantern are adversely affected by having to replace the lantern battery, a relatively standard one of which has an average useful life of approximately four hours.

Rechargeable lighting sources, such as flashlights, have also been developed. In one such device, a rechargeable battery and the charging mechanism are sealed in the flashlight case, and a pair of blade contacts suitable for plugging into a standard wall outlet extend from the flashlight case and are covered by a snap-on cover during normal use of the flashlight. When the batteries become discharged from use of the light, the cover is removed and the entire flashlight unit is plugged into a wall outlet for recharging.

Rechargeable hand lanterns have also appeared on the market. A hand lantern is essentially a large flashlight employing a reflector of approximately three or more inches in diameter and utilizing a case larger than a standard flashlight case, the case ordinarily being adapted to receive a six-volt "lantern battery". The six-volt lantern battery is generally square in sectional shape, and has two spring terminals extending from its top face for making contact with the base of the bulb and the switch mechanism used in the hand lantern.

A first rechargeable hand lantern employs a rechargeable battery shaped similarly to a standard lantern battery, so that it fits in a standard hand lantern body. However, in place of the spring terminals found on the face of the standard lantern battery, the rechargeable battery has wire leads with a plug type end connector, and the hand lantern itself is provided with complementary plug connector with wiring providing the requisite connections to the bulb and switch mechanism. The battery is removed from the lantern body for charging, charging being accomplished by a separate charging transformer connected by a plug terminal to the battery with the charging transformer itself being plugged into a wall outlet. After the battery has been recharged, the plug connections made for recharging are separated, the battery is replaced in the lantern, and the plug connection with the lantern wiring is re-established. A disadvantage in this system is the possibility of loss or difficulty in locating the charging transformer and the loss of use of the lantern during the recharging period unless there is a second battery complete with the necessary plug connector ready for use.

A second lantern has rechargeable lead acid batteries mounted in the lantern housing together with a transformer and line cord for connecting the charging transformer to a wall outlet. When the batteries become discharged, the lantern is opened by removing the head assembly (including the reflector, lens, bulb and bulb receptacle) to gain access to the charging cord, which is plugged into a wall outlet for recharging the batteries. A disadvantage of this lantern is that it cannot be used for the period when the batteries are being recharged.

Thus, there is need for a more convenient serviceable solution to the problems of rechargeable batteries for hand lanterns or similar devices.

SUMMARY OF INVENTION

A rechargeable battery pack according to the invention herein comprises at least one rechargeable battery, and preferably two rechargeable batteries of the lead acid type, and a transformer connected for recharging the rechargeable battery, in a case having external terminals for drawing current from the rechargeable battery and a cord extending therefrom and terminating in a plug for insertion into a standard wall outlet to draw charging current. Wiring is provided connecting the terminals of the rechargeable battery to the external terminals of the case of the rechargeable battery pack and connecting the transformer to the terminals of the rechargeable batteries for charging them, and the cord is also connected to the transformer. The external terminals of the rechargeable battery pack are spring loaded to make electrical contact in devices such as hand lanterns in the same manner as a standard lantern battery. The rechargeable battery pack is generally rectangular in shape, and is narrower and longer than a standard lantern battery. The invention further comprises a combination of the rechargeable battery pack described above with a hand lantern or similar device adapted to receive and operate with either the rechargeable battery pack or with a standard lantern battery, as desired, such as when the rechargeable battery pack is removed for recharging.

Accordingly, it is a principal object of the invention herein to provide a rechargeable battery pack for hand lanterns and similar devices.

It is an additional object of the invention herein to provide a rechargeable battery pack which is self-contained.

It is a further object of the invention herein to provide the combination of a rechargeable battery pack and a hand lantern wherein the hand lantern may also be used with a standard lantern battery.

Other and more specific objects and features of the invention herein will in part be obvious and will in part appear from the perusal of the following description of the preferred embodiment taken together with the drawings.

DRAWINGS

FIG. 1 is a perspective view of a rechargeable battery pack according to the invention herein;

FIG. 2 is a plan view of the interior of the rechargeable battery pack of FIG. 1, prior to assembly of the case thereof;

FIG. 3 is a perspective view of the rechargeable battery pack of FIG. 1 and a hand lantern, disassembled, which accepts either the rechargeable battery pack or a standard lantern battery, both of which are shown;

The same reference numerals refer to the same elements throughout the various Figures.

DESCRIPTION OF PREFERRED EMBODIMENT

Figure 4:
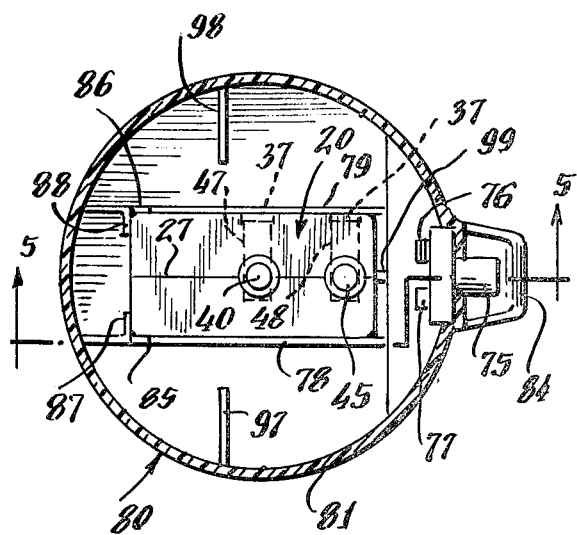
FIG. 4 is a cross-sectional view of the lantern body showing the rechargeable battery pack received therein, taken along the lines 4—4 of FIG. 5.

With reference to FIGS. 1 and 2, a rechargeable battery pack 10 according to the invention is illustrated; and with reference to FIGS. 3-7, the rechargeable battery pack 10 is shown used in combination with a hand lantern 70, which may also utilize a standard lantern battery. The rechargeable battery pack 10 generally comprises a case 20 having protruding terminals 40 and 45, batteries 50 and 55, a transformer 60, a line cord 65 and other wiring as more fully described below.

The case 20 is generally rectangular in shape, comprising a front panel 21 and parallel spaced apart rear panel 22, a top panel 23, a bottom panel 24 and side panels 25 and 26, with the terminals 40 and 45 protruding from the top panel 23. The case is formed in two "box halves" 20a and 20b, the box half 20a including the front panel 21 and half of each of the top, bottom and side panels and the box half 20b including the rear panel 22 and the other halves of the top, bottom and side panels. The box halves 20a and 20b fit together along a seam 27 where they are either sonic welded or solvent welded together to form the complete case 20. The interior components are mounted prior to final assembly.

With reference to FIG. 2, the rechargeable battery pack 10 is shown with the box half 20a of the case 20 removed to expose the interior components. The batteries 50 and 55 are preferably of the rechargeable lead acid type and have a cylindrical shape sized the same as a standard D cell battery. The battery 50 has a negative terminal tab 51 and a positive terminal tab 52 and the battery 45 has a negative terminal tab 56 and a positive terminal tab 57, all of the terminal tabs extending respectively from the top surfaces of the batteries. The batteries may be purchased from Gates Energy Products, Inc., Part Number 0810-0004 and are two-volt batteries generating 2.4 ampere hours of current when charged. As best seen with respect to the box half 20a, a horizontal rib 28 is provided on the interior of the front panel 21 spaced apart from the bottom wall 24 by the length of batteries 50 and 55, and a vertical rib 29 is provided upstanding from the front panel 21 and extending between the bottom wall 24 and the rib 28. The second case half 20b is provided with similar ribs upstanding from the rear panel 22, wherein the batteries 50 and 55 are held in position within the case 20 by the aforesaid ribs. A double-ended terminal clip 54 connects the positive terminal 52 of battery 50 with the negative terminal 56 of battery 55, thereby electrically connecting the batteries 50 and 55 in series.

The transformer 60 is an AC to DC transformer structurally comprising a U-shaped frame 61 and a wound core 62 having taps from the secondary side, as is well-known in the transformer art. A pair of opposed U-shaped flanges 30 and 31 are provided on the interior of the rear panel 22 of the case 20, and a corresponding pair of opposed U-shaped flanges 32 and 33 are provided on the interior of the front panel 21 of the case 20, the U-shaped flanges 30-33 embracing the frame 61 of the transformer 60 to hold the transformer in the position shown in the assembled rechargeable battery pack 10. The primary side of the transformer 60 is connected to a two-conductor line cord 65 which exits the case 20 at an opening 34 formed in halves along the seam 27 on side panel 26, the cord 65 terminating in a plug 66 for insertion into a standard wall outlet.

The terminal 40 (terminal 45 is the same) comprises a shaft 41, an enlarged head 42 and an enlarged foot 43, i.e. the terminals 40 and 45 are generally in the shape of a dumbbell. The top panel 23 of the case 20 defines circular openings 35 and 36 along the seam 27, and the shafts of the terminals 40 and 45 extend through the openings 35 and 36, respectively, with the heads 42 above the top panel and the feet 43 below the top panel. The terminals 40 and 45 are mounted in the openings prior to sealing the case halves 20a and 20b together. Coil springs 44 and 46 are deployed surrounding the terminal shafts and extending between the top panel 23 and the enlarged heads of the terminals 40 and 45 to bias the terminals upwardly, with the feet of the terminals keeping the terminals secured to the case 20. A pair of secondary terminals 37 and 38 are respectively mounted to the rear panel 22 and have flexible spring blades 47 and 48 extending outwardly to positions under the terminals 40 and 45, as also seen in FIG. 4. When the terminals 40 and 45 are in their fully upwardly biased position, as terminal 40 is shown in FIG. 2, the flexible spring blades 47 and 48 are in their free positions leaving an air gap between the feet of the terminals 40, 45 and the flexible spring blades 47 and 48, respectively. Thus, when the rechargeable battery pack is removed from the device in which it is used, the terminals 40 and 45 are not connected to the battery. This substantially reduces the chance of shorting across the battery terminals, i.e. both terminals 40 and 45 must be depressed simultaneously against their coil springs 44 and 46 and into contact with the flexible spring blades 47 and 48 by a bridging conductive strip in order to short the batteries. As is known, lead acid batteries can develop relatively high current is shorted, and the foregoing structure minimizes that possibility. When the rechargeable battery pack is in use, the terminals are depressed, such as is shown with respect to terminal 45 in FIG. 2. The flexible spring blades 47 and 48 are in self-biasing engagement against the feet of terminals 40 and 45 once the air gap has been closed. Of course, the flexible spring terminals may be in constant self-biasing contact with the terminal feet if other types of rechargeable batteries, such as nickel-cadmium batteries, are used.

Wiring is provided to operatively connect the various elements described above, and more particularly, a terminal clip 53 is connected to the negative terminal 51 of battery 50 and wires 58 and 59, respectively, extend to the tap 63 of the transformer 60 and the secondary terminal 37. Similarly, a terminal clip 67 is secured to the positive terminal 57 of the battery 55, and wires 68 and 69, respectively, connect the terminal clip with the transformer 60 and the secondary terminal 38.

After the batteries, transformer, terminals, secondary terminals and associated wiring have been assembled into the case half 20a, the second case half 20b is fitted over the internal components and the two case halves are secured together to form the case 20. The case is fabricated of plastic, with the case halves being molded and secured together by sonic or solvent welding or other techniques familiar in the plastics industry. The plug 66 is inserted into a standard wall outlet to charge the batteries 50 and 55 of the rechargeable battery pack 10, utilizing the self-contained transformer 60. The charge is regulated by the internal resistance of the batteries themselves, which increases as the batteries approach a full charge. Once the batteries have been fully charged, the plug 66 is removed from the wall outlet and the rechargeable battery pack may be used by making electrical contact across the terminals 40 and 45 through an electrical load, such as the bulb in a hand lantern or similar device. Of course, the rechargeable battery pack 10 may be charged and discharged numerous times, and has a long period of usefulness.

The invention further comprises the combination of the rechargeable battery pack 10 described above and a hand lantern 70 which accepts either the rechargeable battery pack 10 or a standard lantern battery 71, as illustrated in FIGS. 3-7. The hand lantern 70 generally comprises a lantern body 80 and a lantern head 90.

The lantern body 80 has a generally cylindrical sidewall 81 and a bottom 82. A handle 84 is integrally molded with the cylindrical sidewall and mounts a button switch 75 which makes or breaks contact between two contact strips 76 and 77 which extend into the interior of the lantern body from the sidewall 81. The top of the cylindrical sidewall 81 is threaded at 83 to receive the lantern head 90. The lantern head 90 comprises an annular cap 91 with a threaded skirt 92 for attaching the lantern head to the lantern body. A lens, not shown, extends across the front of the cap 91, and a reflector 93 is inserted into the cap 91. At the apex of the reflector is a bulb receptacle which mounts the bulb for the hand lantern, and a conductor strip 94 is provided on the bottom of the bulb receptacle and is in contact with the base of the bulb, and parallel circular contact plates 95 and 96 extend radially outwardly from the bulb receptacle. When the hand lantern 70 is assembled, the central terminal 40 of the rechargeable battery pack 10 or the central spring terminal 72 of the lantern battery 71 makes contact with the contact strip 94 and hence with the base of the bulb, and the other terminal of either the rechargeable battery pack or the standard lantern battery makes contact with the circular plate 95. The second circular contact plate 96 makes contact with the side of the bulb through the bulb receptacle, and the two contact plates are in contact with the contact strips 76 and 77 associated with switch 75, wherein the switch 75 when closed completes the circuit through the bulb.

Figure 5:
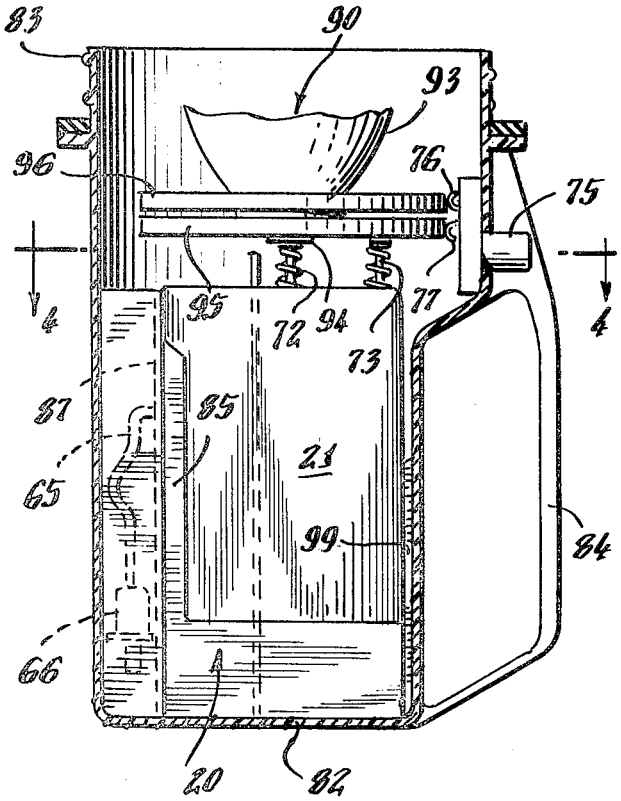
FIG. 5 is a sectional view of the lantern body showing the rechargeable battery pack received therein, taken along the lines 5—5 of FIG. 4.

The lantern body 80 receives the power source for the hand lantern 70 which can be either the rechargeable battery pack 10 or the standard lantern battery 71. With reference to FIGS. 4 and 5, the rechargeable battery pack 10 is shown mounted in the lantern body 80. In this regard, a pair of parallel horizontally disposed, spaced apart cross ribs 78 and 79 are upstanding from the bottom 83 of the lantern body 80 and the lower end of the rechargeable battery pack 10 is received between these ribs. A pair of vertical parallel ribs 85 and 86 extend inwardly from the cylindrical sidewall 81 of the lantern body 80, these ribs being integral with the horizontal bottom cross ribs 78 and 79. The vertical ribs 85 and 86 flank the vertical marginal edges of the front and back panels of the case 20 of the rechargeable battery pack 10. Two vertical flanges 87 and 88 extend toward each other from the vertical ribs 85 and 86, respectively, and these vertical flanges are positioned adjacent the vertical marginal edges of the side 26 of the rechargeable battery pack 10. An additional vertical rib 99 butts against side 25, to space it from sidewall 81. Thus, the rechargeable battery pack 10 may be inserted into the lantern battery body 80 with its terminals 30 and 35 extending upwardly, and the ribs 78, 79, 85, 86 and 99 together with the additional vertical flanges 87 and 88 serve to position it within the lantern body 80. The line cord 65 and plug 66 connected thereto may be stored in the remaining space in the lantern body adjacent the case 20 of the rechargeable battery pack 10. The lantern head 90 may then be screwed on to the lantern body 80 which causes contact to be made between the terminals 30 and 35 of the rechargeable battery pack 10, and the bulb base contact strip 94 and the circular contact plate 95, respectively. The lantern is then ready to use and is operable under control of the switch 75.

When the rechargeable battery pack 10 becomes discharged, it may be removed for charging, and the standard lantern battery 71 may be inserted into and used with the hand lantern 70 during the recharge time. It will be noted that there are physical differences between the rechargeable battery pack 10 and the lantern battery 71, namely the lantern battery 71 has an essentially square cross section (with rounded corners) and its overall width is less than the rechargeable battery pack, but its depth is greater. The height of lantern battery 71 is less than the height of the rechargeable battery pack 10. Therefore, the ribs, which function as described above to receive and hold rechargeable battery pack 10, function in a different manner with respect to the lantern battery 71.

Figure 6:
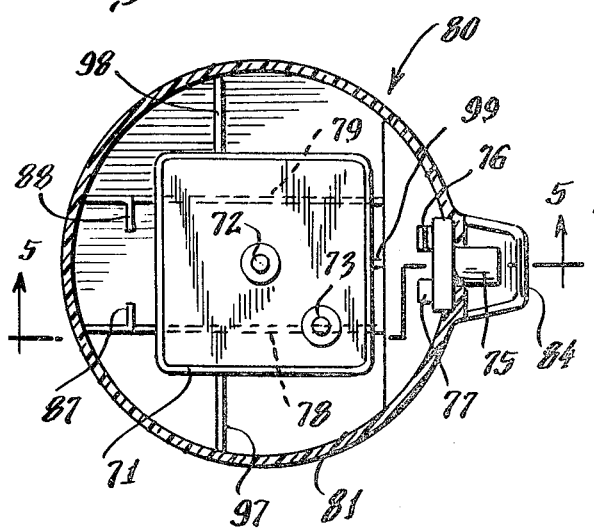
FIG. 6 is a cross-sectional view of the lantern body showing the standard lantern battery received therein, taken along the lines 4—4 of FIG. 5.
Figure 7:
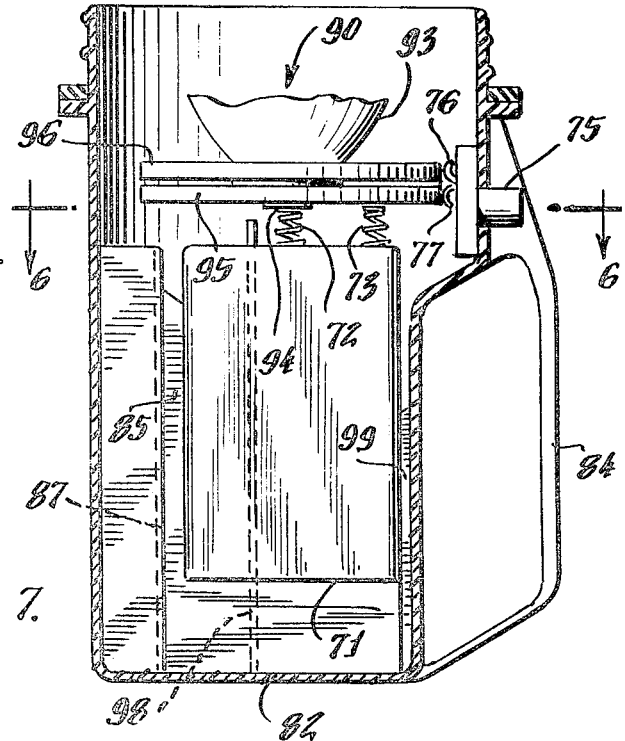
FIG. 7 is a sectional view of the lantern body showing the standard lantern battery received therein, taken along the lines 7—7 of FIG. 6.

The lantern battery 71 is shown in the lantern body 80 in FIGS. 6 and 7. The horizontal bottom cross ribs 78 and 79, which flank the case of the rechargeable battery pack 10, support the bottom of the lantern battery 71 on their upper edges. This compensates for the difference in height between the rechargeable battery pack 10 and the lantern battery 71. The vertical ribs 85 and 86, which also flanked the rechargeable battery pack 10, bear against the sidewall of the lantern battery 71. Additional vertical ribs 97 and 98 also bear against the sides of the lantern battery 71, whereby the lantern battery is supported and positioned such that when the lantern head 90 is screwed on to the lantern body 80, proper contact is made between the central terminal 72 and the bulb base contact strip 94, and the other terminal 73 and a contact plate 95. Thus, the inconvenience of not being able to use the hand lantern during recharging is avoided.

While the combination of the rechargeable battery pack and the hand lantern which also accepts the lantern battery has been described above in the context of the hand lantern, it will be appreciated that this feature is also applicable to other devices which utilize lantern batteries.

Accordingly, the preferred embodiment described admirably achieves the objects of the invention herein, and it will be appreciated that changes may be made from the preferred embodiment without departing from the spirit and scope of the invention, which is limited only by the following claims.

We claim:

1. A rechargeable battery pack comprising a case having two terminals extending therethrough for exterior access and having mounted therein at least one rechargeable battery, an AC-DC transformer for charging the battery and wiring connecting the battery to the two terminals extending through the case for drawing current and connecting the battery to the DC side of the transformer for charging, the wiring including a line cord extending from the AC side of the transformer through the case and terminating in a plug connector for insertion into a standard wall outlet, wherein the two terminals extending through the case each comprises an enlarged head positioned outside the case, a shaft extending through an opening in the case and an enlarged foot positioned inside the case and thereby securing the terminal to the case, and a coil spring deployed between the outer surface of the case and the head of the terminal, whereby the two terminals are biased outwardly from the case and yield into spring biased contact with contact strips, contact plates or the like of devices in which the rechargeable battery pack is utilized.

2. A rechargeable battery pack as defined in claim 1 and further comprising two secondary terminals mounted in the case and connected by the wiring to the battery terminals, each secondary terminal including a flexible spring blade extending to under the foot of a corresponding one of the two terminals, the flexible spring blade self-biasing against the foot of the corresponding terminal to make electrical contact therewith.

3. A rechargeable battery pack as defined in claim 2 wherein the case is rectangular and comprises front and rear panels, top and bottom panels and side panels, the case being formed in two box halves with the seam joining the box halves extending through the top, bottom and side panels, and the openings for the shafts of the two terminals and the line cord are formed intersecting the seam to permit mounting the two terminals and line cord prior to securing the box halves together.

4. A rechargeable battery pack as defined in claim 3 wherein the at least one battery comprises two rechargeable lead acid batteries connected in series and the front and rear panels of the case each has a rib upstanding from the interior surface between the sidewalls and spaced apart from the bottom wall by the height of the batteries, the ribs holding and positioning the batteries within the assembled case, and the front and rear panels of the case each has a U-shaped flange upstanding from the interior surface thereof, the U-shaped flanges holding and positioning the transformer within the assembled case.

5. A rechargeable battery pack as defined in claim 4 wherein each of the flexible spring blades of the secondary terminals has a free position leaving an air gap between it and the corresponding terminal until said terminal is depressed against its coil spring into contact with the spring blade, whereby both terminals must be depressed into contact with their associated flexible spring blades in order to draw current from the batteries, thereby minimizing the risk of shorting the batteries.

6. A rechargeable battery pack comprising a case having two terminals extending therethrough for exterior access, said case being rectangular and comprising front and rear panels, top and bottom panels and side panels, the case being formed in two box halves with the seam joining the box halves extending through the top, bottom and side panels with openings for shafts of the two terminals formed intersecting the seam, and said case having mounted therein at least one rechargeable battery, an AC-DC transformer for charging the battery and wiring connecting the battery to the two terminals extending through the case for drawing current and connecting the battery to the DC side of the transformer for charging, the wiring including a line cord extending from the AC side of the transformer through an opening formed intersecting the seam of the case and terminating in a plug connector for insertion into a standard wall outlet, whereby the two terminals and line cord are mounted prior to securing the box halves together.

7. A rechargeable battery pack as defined in claim 6 wherein the at least one battery comprises two rechargeable lead acid batteries connected in series and the front and rear panels of the case each has a rib upstanding from the interior surface between the sidewalls and spaced apart from the bottom wall by the height of the batteries, the ribs holding and positioning the batteries within the assembled case, and the front and rear panels of the case each has a U-shaped flange upstanding from the interior surface thereof, the U-shaped flanges holding and positioning the transformer within the assembled case.

8. A rechargeable battery pack as defined in claim 7 wherein each of the flexible spring blades of the secondary terminals has a free position leaving an air gap between it and the corresponding terminal until said terminal is depressed against its coil spring into contact with the spring blade, whereby both terminals must be depressed into contact with their associated flexible spring blades in order to draw current from the batteries, thereby minimizing the risk of shorting the batteries.

9. A rechargeable battery pack as defined in claim 2 wherein the at least one rechargeable battery is of the lead acid type and wherein each of the flexible spring blades of the secondary terminals has a free position leaving an air gap between it and the corresponding terminal until said terminal is depressed against its coil spring into contact with the spring blade, whereby both terminals must be depressed into contact with their associated flexible spring blades in order to draw current from the battery, thereby minimizing the risk of shorting the battery.

10. A battery pack comprising at least one lead acid battery mounted in a case, two terminals extending through the case, each of said two terminals having an enlarged head positioned outside the case, a shaft extending through an opening in the case and an enlarged foot positioned inside the case with a coil spring deployed around the shaft between the outside of the case and the terminal head, whereby the terminals are biased outwardly with respect to the case, and two secondary terminals mounted in the case and connected to the battery terminals, each secondary terminal having a flexible spring blade extending to under the foot of a corresponding one of the two terminals, wherein each of the flexible spring blades of the secondary terminals has a free position leaving an air gap between it and the corresponding terminal until said terminal is depressed against its coil spring into contact with the spring blade, whereby both terminals must be depressed into contact with their associated flexible spring blades in order to draw current from the batteries, thereby minimizing the risk of shorting the batteries.

11. A battery pack as defined in claim 10 wherein the case is formed in two parts with the seam at the joining of the parts, and the openings for the shafts of the two terminals are formed intersecting the seam to permit mounting the two terminals and line cord prior to securing the case parts together.

12. The combination of a rechargeable battery pack and a hand lantern or similar device adapted to receive alternately the rechargeable battery pack or a standard lantern battery, wherein the rechargeable battery pack comprises a rectangular case having two terminals extending through the top thereof for exterior access and having mounted therein at least one rechargeable battery, an AC-DC transformer for charging the battery and wiring connecting the battery to the two terminals extending through the case for drawing current and connecting the battery to the DC side of the transformer for charging, the wiring including a line cord extending from the AC side of the transformer through the case and terminating in a plug connector for insertion into a standard wall outlet, the rectangular case having greater vertical height, greater width and less depth than the standard lantern battery, and the hand lantern comprising a lantern body for receiving either the rechargeable battery pack or the standard lantern battery and a lantern head removable from the lantern body and including contact plates for contacting the terminals of either the rechargeable battery pack or the standard lantern battery, the lantern body having sidewalls and a bottom with two parallel cross-ribs upstanding from the bottom and spaced apart by the depth of the case of the rechargeable battery pack to receive and embrace the lower end of the case of the rechargeable battery pack and to support the bottom of the standard lantern battery on their upper edges with the height of the cross-ribs corresponding to the difference in height between the rechargeable battery pack and the standard lantern battery, and with two parallel vertical ribs extending inwardly from the lantern body sidewalls to receive and embrace the vertical marginal edges of the front and rear panels of the case of the rechargeable battery pack and bear against the sidewall of the standard lantern battery, thereby accounting for the difference in width between the rechargeable battery pack and the standard lantern battery, and with additional vertical ribs for bearing against other sides of the standard lantern battery.

13. The combination of a rechargeable battery pack and hand lantern as defined in claim 11 wherein the vertical ribs receiving and embracing the vertical marginal edges of the front and rear panels of the case of the rechargeable battery pack each has an offset vertical flange extending toward the other rib for engaging against the side of the case of the rechargeable battery pack for positioning it in the lantern body.

* * * * *